March 5, 1940. B. L. SEELEY 2,192,561
LICENSE PLATE HOLDER
Filed Sept. 27, 1939 2 Sheets-Sheet 1
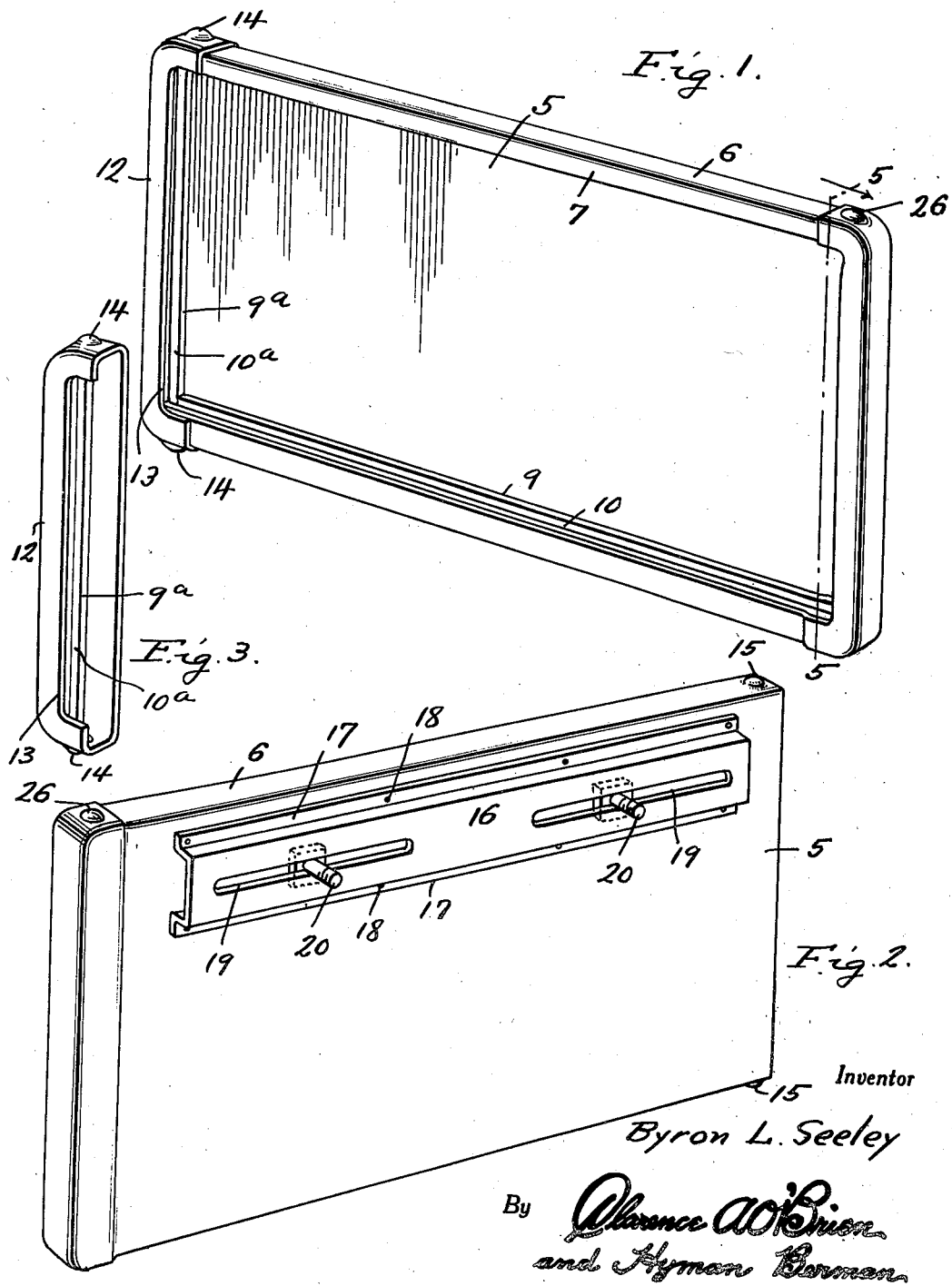
Inventor
Byron L. Seeley
Attorneys March 5, 1940. B. L. SEELEY 2,192,561
LICENSE PLATE HOLDER
Filed Sept. 27, 1939 2 Sheets-Sheet 2
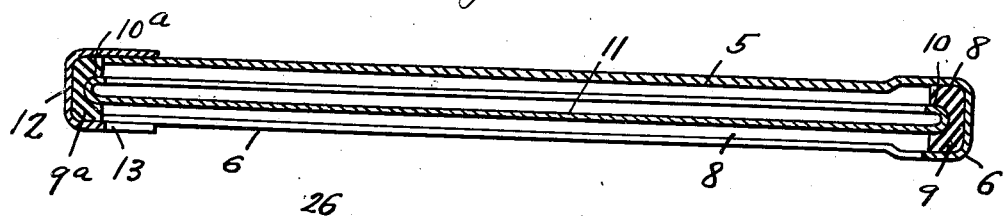
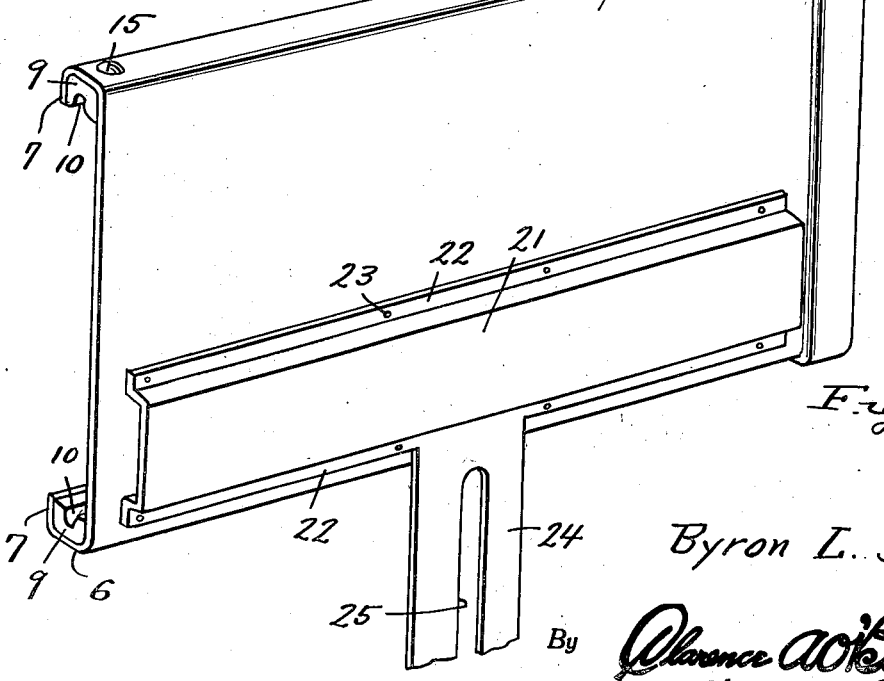
Inventor
Byron L. Seeley
By *Clarence A. O'Brien and Hyman Berman*
Attorneys Patented Mar. 5, 1940

2,192,561

UNITED STATES PATENT OFFICE 2,192,561

LICENSE PLATE HOLDER

Byron L. Seeley, Berkeley, Calif.

Application September 27, 1939, Serial No. 296,852

4 Claims. (Cl. 40—125)

This invention relates to holders for license plates, and an object of the invention is to provide a holder of this character so equipped as to securely maintain thereon the license plate without recourse to bolts and other extraneous fastening elements.

A further object of the invention is to provide a license plate holder which can be cheaply and economically constructed, and which can be so equipped so as to be mounted on a motor vehicle regardless of the model thereof.

A further object of the invention is to provide a license plate holder which in addition to the features above enumerated will also be distinctive and attractive in appearance.

The invention, together with its objects and advantages will be best understood from a study of the following description taken in connection with the accompanying drawings wherein:

Figure 1 is a perspective view of a license plate holder embodying the features of the present invention.

Fig. 2 is a perspective view of the holder but viewing the same from the rear side thereof.

Fig. 3 is a perspective view of a removable end piece or flange section forming part of the invention.

Fig. 4 is a longitudinal sectional view thru the holder with the license plate shown mounted therein.

Fig. 5 is a vertical sectional view through the holder, taken substantially on the line 5—5 of Fig. 1.

Fig. 6 is a view somewhat similar to Fig. 2 but showing a slightly modified form of the invention and with the removable end section or flange omitted.

Referring more in detail to the drawings it will be seen that in the preferred embodiment thereof the license plate holder comprises a substantially rectangular body plate 5 of suitable dimensions and preferably formed from a blank of aluminum or other non-corrosive metal.

The plate 5 has integral therewith a flange 6 that extends along the upper and lower longitudinal edges of the plate and along one end edge of the plate as shown.

The flange 6 is provided with an inturned lip 7 so as to provide with the marginal edge of the plate 5 along said upper and lower longitudinal edges and said one end edge a channel 8.

The channel 8 is lined with a strip 9 of rubber, water-proofed, or other suitable yieldable water-proof material. The lining strip 9, as shown, is provided with a groove 10 to accommodate the beaded edge portion of the license plate 11 as clearly shown in Fig. 4.

Completing the flange structure and serving to securely retain the plate 11 on the holder is a removable flange section 12 formed of the same material from which the plate 5 and integral flange 6 is formed.

The removable flange section 12 is substantially channel-shaped in cross section to telescope on the end of the license plate holder 5 as shown, and the outer side of the section 12 has a portion thereof removed, or in other words is notched as at 13 so as to conform, in width, at said outer side, with the lip 7 thus adding to the symmetry of design and attractiveness of the holder.

At the upper and lower ends thereof the removable flange section 12 has pressed therefrom female retaining elements or sockets 14 that are complemental to and cooperate with male fastening elements 15 in the form of teats formed integrally on the flange 6 at said end of the license plate holder, and as clearly shown.

It will thus be seen that after the license plate 11 has been placed within the confines of the flange 6 the flange section 12 is then telescoped onto an end of the holder and the teats 15 snapped into engagement with the sockets 14 in a manner to releasably secure the removable flange section 12 on the holder and consequently the license plate 11 secured on the holder.

As shown in Fig. 4 the removable flange section 12 is also lined with a strip 9a of rubber or other suitable material complementing the strip 9. The strip 9a is also provided with a groove 10a to complement the groove 10 and receive the adjacent end of the license plate 11.

It will also be apparent that the strip 9 and complemental strip 9a will serve to prevent the collection of water in the license plate retaining channel, and the collection of water behind the license plate, thus further guarding against rusting of the license plate and/or the license plate holder.

For attaching the license plate holder to the bracket with which the vehicle is usually equipped, the holder, in the form of the invention shown in Fig. 2, is provided with an attaching bracket in the form of an elongated channel member 16 the sides of which are provided with outstanding flanges 17 through the medium of which and rivets or other fastening elements 18 the channel member 16 is secured to the rear side of the body plate 5.

The channel member 16 is provided with elongated slots 19 that accommodate the shanks of bolts 20, the heads of which are slidably accommodated in the channel of the bracket plate 16 as shown. Obviously through the medium of the bolts 20 and nuts (not shown), the license plate holder may be thus securely mounted on the bracket as is generally provided at a proper and convenient location on the automobile or other automotive vehicle.

To facilitate mounting the license plate holder on later automobile models the holder, as suggested in Fig. 6 may be equipped with an attaching member in the form of an elongated metallic channel plate 21 the sides of which are provided with outstanding flanges 22 through the medium of which and rivets or other fastening elements 23 said channel member is secured to the rear side of the body plate 5 adjacent the lower edge of the plate.

The flange 22, at the lower side of the channel, and intermediate the ends of the channel, is provided with an integral attaching tongue 24 provided with a slot 25 to accommodate bolt and nut means through the medium of which the license plate holder may be properly mounted on such types of cars as are equipped to complement the aforementioned attaching tongue 24.

From a design standpoint or the standpoint of appearance, it is also desired, and as suggested in the drawings, that the body plate 5 and the flange 6 at the closed end of the holder be pressed laterally outwardly as more clearly suggested in Figs. 1, 2 and 4 so that at this end of the holder the appearance will be substantially the same as at the end of the holder with which the removable section 12 is associated. Also at the closed end of the holder the flange 6 at the top and bottom thereof is provided with protuberances or teats 26 to complement, from an appearance standpoint, the sockets or protuberances 14 on the removable flange section 12. Thus when completely assembled, the holder will have the opposite ends thereof substantially identical in appearance and appear as a more finished product.

It is thought that a clear understanding of the construction, utility and advantages of a license plate holder embodying the features of the present invention will be had without a more detailed description thereof.

Having thus described the invention, what is claimed as new is:

1. A license plate holder comprising a substantially rectangular body plate having along the two longitudinal edges and one end edge thereof an integral flange provided with an inturned lip presenting an internal channel for accommodating the corresponding longitudinal and end edges of a license plate, and a removable end flange section for the open end of the holder, said removable flange section being channel-shaped in cross section and telescopically fitting the open end of the holder and complementing the aforementioned flange of the holder, and a waterproof strip of yieldable material lining the channel of said flange, and a complemental strip lining the channel of said removable flange section, said strips having grooves therein for accommodating the marginal edge of a license plate.

2. A license plate holder comprising a substantially rectangular body plate having along the two longitudinal edges and one end edge thereof an integral flange provided with an inturned lip presenting an internal channel for accommodating the corresponding longitudinal and end edges of a license plate, and a removable end flange section for the open end of the holder, said removable flange section being channel-shaped in cross section and telescopically fitting the open end of the holder and complementing the aforementioned flange of the holder, and a waterproof strip of yieldable material lining the channel of said flange, a complemental strip lining the channel of said removable flange section, said strips having grooves therein for accommodating the marginal edges of a license plate, and an attaching bracket mounted on said body plate at the rear side thereof and equipped with means for mounting the license plate holder on the body of a motor vehicle.

3. A license plate holder comprising a substantially rectangular body plate having along the two longitudinal edges and one end edge thereof an integral flange provided with an inturned lip presenting an internal channel for accommodating the corresponding longitudinal and end edges of a license plate, and a removable end flange section for the open end of the holder, said removable flange section being channel-shaped in cross section and telescopically fitting the open end of the holder and complementing the aforementioned flange of the holder, a water-proof strip of yieldable material lining the channel of said flange, a complemental strip lining the channel of said removable flange section, said strips having grooves therein for accommodating the marginal edges of a license plate, an attaching bracket mounted on said body plate at the rear side thereof and equipped with means for mounting the license plate holder on the body of a motor vehicle, said attaching bracket being in the form of an elongated channel member equipped with slots elongated longitudinally thereof, and bolts having shanks working in said slots and heads working in the channel of said channel member.

4. A license plate holder comprising a substantially rectangular body plate having along the two longitudinal edges and one end edge thereof an integral flange provided with an inturned lip presenting an internal channel for accommodating the corresponding longitudinal and end edges of a license plate, and a removable end flange section for the open end of the holder, said removable flange section being channel-shaped in cross section and telescopically fitting the open end of the holder and complementing the aforementioned flange of the holder, a waterproof strip of yieldable material lining the channel of said flange, a complemental strip lining the channel of said removable flange section, said strips having grooves therein for accommodating the marginal edges of a license plate, an attaching bracket mounted on said body plate at the rear side thereof and equipped with means for mounting the license plate holder on the body of a motor vehicle, said attaching bracket consisting of an elongated channel member mounted on the rear side of said body plate and extending longitudinally thereof, and said channel member having an integral depending slotted attaching tongue, as and for the purpose specified.

BYRON L. SEELEY.